Sept. 30, 1952     H. WOLLNER     2,612,376
EXPANSION ARBOR
Filed Feb. 2, 1946     2 SHEETS—SHEET 1
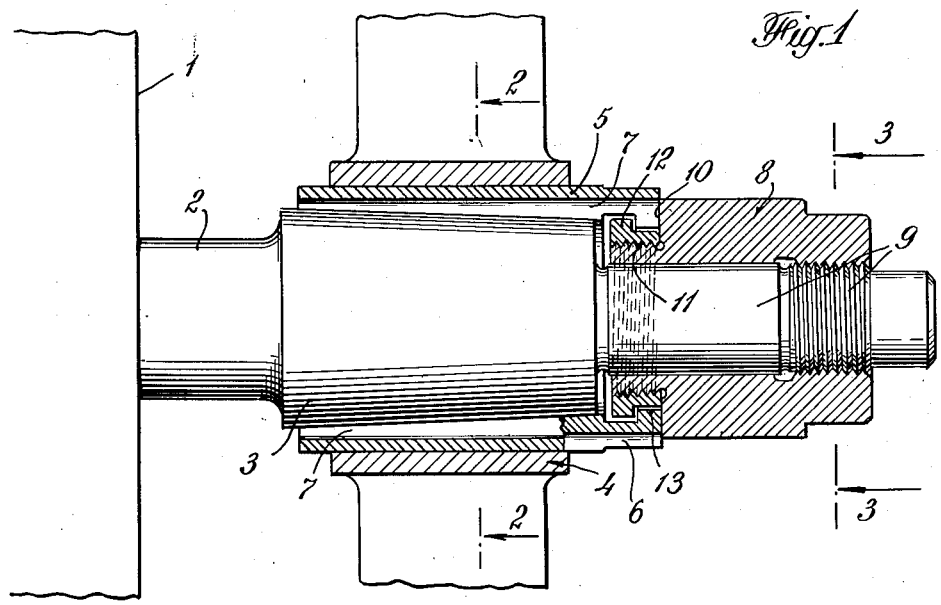
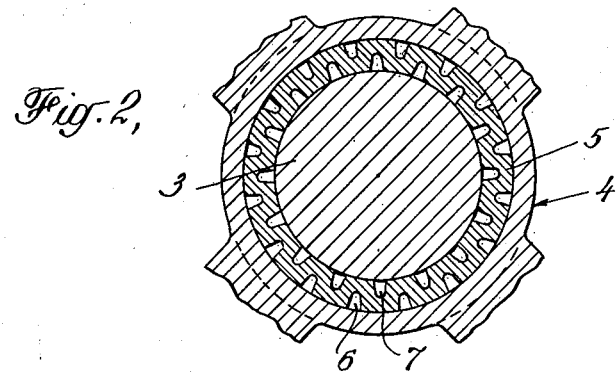
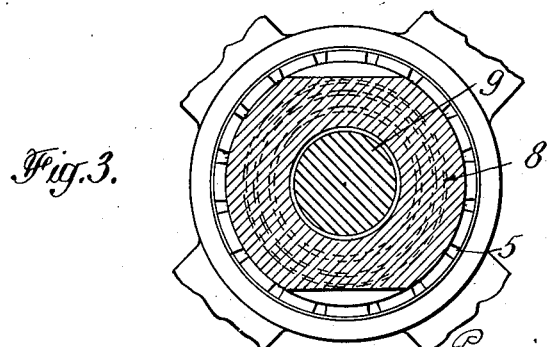
INVENTOR
HANS WOLLNER
BY
Pennie, Edmonds, Morton & Barrows
ATTORNEYS Sept. 30, 1952        H. WOLLNER        2,612,376
EXPANSION ARBOR Filed Feb. 2, 1946                           2 SHEETS—SHEET 2

INVENTOR
HANS WOLLNER
BY Pennie, Edmonds, Morton & Barrows
ATTORNEYS

Patented Sept. 30, 1952

2,612,376

UNITED STATES PATENT OFFICE 2,612,376

EXPANSION ARBOR

Hans Wollner, Detroit, Mich., assignor to Vinco Corporation, Detroit, Mich., a corporation of Michigan Application February 2, 1946, Serial No. 645,145

9 Claims. (Cl. 279—2)

This invention relates to improvements in expansion arbors for attaching machine parts to rotating spindles. The invention is particularly useful in the manufacture of machine parts for attaching the work pieces to be shaped to the spindles of machine tools or grinding machines by which they are supported and rotated while being shaped by the tool or grinding wheel. In the manufacture of gears, for example, it is necessary that the blank be centered with extreme accuracy on the rotating spindle of the machine tool or grinder, by means of which the teeth are formed or finished. It is also necessary that the gears be made with smooth-finished, accurately centered shaft openings so that they may be accurately splined for their attachment to the shaft of the machine in which they are to be used.

The attachment of work pieces to the spindles of machine tools has heretofore been accomplished in various ways all of which, however, to my knowledge, have resulted in an unbalanced pressure upon the metal of the work piece so that when the work piece is removed from the spindle it will be out of true to an amount to be significant where close manufacturing tolerances must be met, and the primary object of this invention is to provide an expansion arbor by means of which a work piece may be firmly attached to a rotating spindle so that it is accurately centered with respect to the axis of rotation of the spindle and is not subjected to any unbalanced pressure throughout its entire circumference.

A further object of the invention is to provide an expansion arbor by means of which a work piece may be quickly attached to and detached from the spindle by which it is to be rotated.

A further object of the invention is to provide an expansion arbor of general application for attaching parts to rotating spindles which is of low manufacturing cost, which may be readily manufactured in various sizes, and which is adapted for use either as a temporary or permanent connection wherever a part to be rotated is attached to a shaft or spindle.

In the accompanying drawings I have illustrated a preferred embodiment of my invention and in the said drawings:

Fig. 1 is a longitudinal section of a spindle having a blank or work piece attached to it by means of my improved expansion arbor;

Figs. 2 and 3 are cross sections on the similarly numbered lines of Fig. 1;

Figure 4:
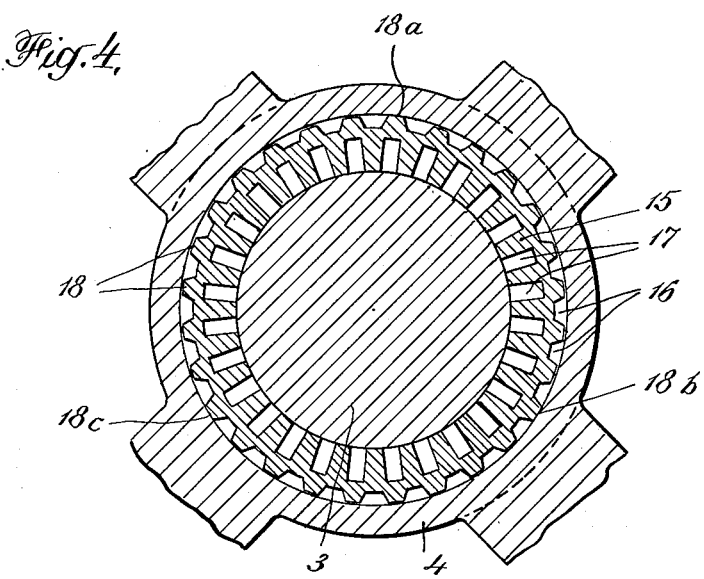
Fig. 4 is a sectional view similar to Fig. 2 but showing a slightly modified form of arbor.

In the drawings, 1 indicates the frame of the machine on which is supported by means of a bearing, not shown, a rotating spindle 2. The spindle 2 is provided with a tapered portion 3 to which the work piece, indicated at 4, is attached. Between the work piece 4 and the tapered portion 3 of the spindle is a sleeve 5 whose inner bore is tapered to fit the spindle and whose outer cylindrical surface is finished to have a snug sliding fit in the bore of the work piece. This sleeve is made of steel or other suitable material having a reasonably high coefficient of elasticity. The sleeve 5 is provided throughout its entire outer circumference with longitudinal grooves 6 which are uniformly spaced and of uniform dimensions, and which preferably extend approximately half way through the thickness of the sleeve. The sleeve 5 is similarly provided on its interior surface with longitudinal grooves 7 of uniform dimensions and uniform spaces, which grooves also extend approximately half way through the thickness of the sleeve. The grooves 7 are staggered with respect to the groove 6 as shown in Fig. 2, so that the sleeve is symmetrical through its circumference and when subjected to radial pressure either inwardly or outwardly, will contract or expand to a limited degree and still maintain its exact symmetry with respect to its axis.

Any suitable means may be employed to exert longitudinal pressure on the sleeve 5 to effect its expansion and contraction. I have illustrated for the purpose a pilot nut 8 threaded on an extension 9 of the spindle 2 beyond the tapered portion 3. This pilot nut is formed with a shoulder 10 which engages the end face of the sleeve 5 and serves on rotation of the nut with respect to the spindle to force the sleeve to the left, as shown in Fig. 1, and thereby effect its uniform expansion within the bore of the work piece 4. For shifting the sleeve in the opposite direction to contract the sleeve and release the work piece the pilot nut 8 is provided with a reduced portion 11 at its end adjacent the tapered portion 3 of the spindle, and mounted on this reduced portion of the nut 8, preferably by means of a left-hand thread, is a collar 12 which engages the face of an inwardly extending flange 13 formed on the end of the sleeve 5 adjacent the nut 8. The collar 12 is attached to the nut 8 before sleeve 5 is assembled on the tapered portion of the spindle. The nut 8 is preferably provided with opposite flat faces near its outer end and the spindle may be similarly provided with opposite flat faces on the other side of the tapered portion 3, to facilitate holding the spindle when the nut 8 is turned on its thread to loosen or tighten the sleeve in the work piece.

In the embodiment shown in Figs. 1, 2 and 3, there are sixteen outside grooves 6 and sixteen inside grooves 7, hence with an expansion at each groove of an extent too small to be independently measured the arbor may be expanded from a diameter where the work piece is freely rotatable on the arbor to an extent sufficient to hold the work piece firmly and exactly in position on the spindle. Furthermore, even though the resistance to expansion may be greater in one portion of the metal of the sleeve than in some other portion, the sleeve will nevertheless expand uniformly for the reason that the friction between the sleeve and the tapered portion of the spindle is such as to counteract any tendency to rotary movement of the sleeve during its expansion.

In Fig. 4 I have illustrated a somewhat modified form of arbor which is particularly useful where the torque to be transmitted from the arbor to the work piece is not great. As here shown the expansible arbor 15 is provided with a series of deep grooves 17 on its inner surface and with alternating grooves 16 on its outer surface, the grooves 16 being shallower than the grooves 17 and with projections 18 between the grooves 16 of generally trapezoidal cross section. All the projections 18 except three at equally spaced points and designated in the drawings 18a, 18b and 18c are machined off slightly on the outer faces so as not to contact with the inner surface of the work piece when the arbor is expanded. The three spaced projections serve to accurately center the work piece with respect to the axis of rotation of the arbor and provide sufficient driving engagement for the torque that needs to be transmitted in a machining operation.

The advantage of the structure shown in Fig. 4 over the previously described form of the invention is that there is much less frictional resistance to the longitudinal movement of the expansible arbor with respect to the spindle and the work piece. It is frequently desirable that the work piece be positioned at a definite axial point on the spindle, and that with the expansible arbor of Fig. 4 the work piece can be readily held against axial movement while the arbor is shifted longitudinally to expand the arbor to effect a driving engagement between the spindle and the work piece.

The arbor of Fig. 4 also has the advantage that only the three projections 18a, 18b and 18c have to be finished within small dimensional tolerances to secure an accurate positioning of the work piece. The intervening portions of the arbor which do not contact the work piece provide in effect expansible connections between the three projections 18a, 18b and 18c but as these intervening portions of the arbor do not contact the inner surface of the work piece it is not necessary that their surfaces be finished with the same accuracy as the portions which serve as the driving connection.

It will be understood of course that the number of ribs or projections which engage the bore of the work piece at each of the three points 18a, 18b and 18c, may be varied as desired.

Figure 5:
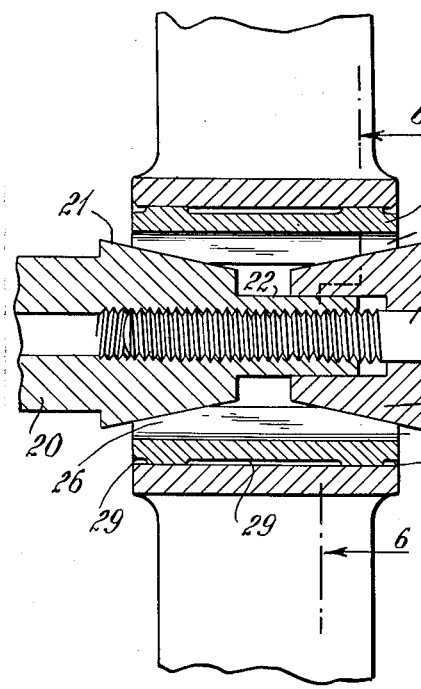
Fig. 5 is a longitudinal sectional view of a modified form of the arbor-expanding mechanism.
Figure 6:
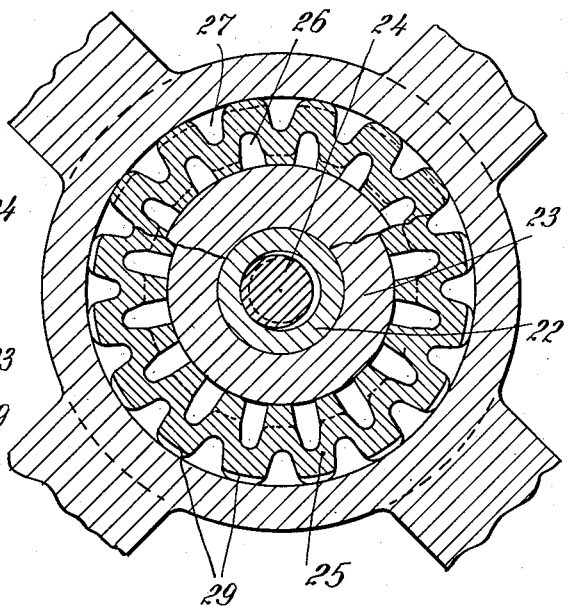
Fig. 6 is a sectional view on line 6—6 of Fig. 5.

In Figs. 5 and 6 I have shown a further modified form of my invention. As here shown the spindle 20 has a tapered portion 21 near the outer end and beyond the tapered portion has a reduced portion 22 which may be square or hexagonal and on which is mounted for sliding movement a conical piece 23 having a tapered exterior surface corresponding with the surface of the portion 21. The spindle 20 is threaded as shown to receive a screw 24 whose head bears against the hub of the conical piece 23. The expansible arbor 25 as here shown consists of a continuous ring having a series of spaced interior slots 26 and a series of spaced exterior slots 27. The bore of the arbor is oppositely tapered at each end to fit, respectively, the tapered portion of the spindle and the outer surface of the conical piece 23. The outer surface of the arbor between the longitudinal slots may be shaped throughout to fit the bore of the work piece but preferably the metal is cut away in the middle portion and at the end as indicated at 29 so that the arbor engages the bore of the work piece at two axially spaced locations, thereby reducing the friction between the arbor and the work piece, at the same time providing sufficient driving connection and accurate centering of the work piece with respect to the axis of rotation of the spindle.

In practice it has been demonstrated that pieces which have been shaped while mounted on a spindle with the expansion arbor embodying my invention are not subject to distortion, and no change in shape can be detected by the most delicate instrument when the work pieces are removed from the spindle.

It is of course to be understood that the construction shown in the drawing and described above may be variously modified without departing from the spirit of the invention. For example, the outer surface of the sleeve may be tapered instead of the inner surface, particularly if the work piece has a tapered bore. Any suitable means may be used for shifting the tapered arbor for effecting a relatively longitudinal movement of the tapered arbor and the cooperating tapered member. Also the arrangement of grooves in the inner and outer surfaces of the arbor need not be of the exact arrangement illustrated. It is essential that a plurality of grooves be provided in the tapered surface so that the sleeve may be expanded by the relative longitudinal movement of the two tapered parts. It is also essential that the plurality of grooves be provided in the other surface of the sleeve so that it likewise may expand and contract, but the exact design and arrangement of the grooves, while preferable, is not essential to securing a firm, accurately centered connection between the work piece and the arbor. It will therefore be understood that the invention is not limited to the features of construction shown except insofar as such features are enumerated in the appended claims.

I claim:

1. In an expansion arbor, an expansible element including a length of continuous sleeve having a series of spaced longitudinal grooves the length of its outer surface and a series of spaced longitudinal grooves the length of its inner surface, the grooves of both series extending to a depth less than the thickness of the sleeve, one surface being axially tapered.

2. In an expansion arbor, an expansible element including a length of continuous sleeve having a series of uniformly spaced longitudinal grooves the length of its outer surface and a series of uniformly spaced longitudinal grooves the length of its inner surface, the grooves of both series extending to a depth less than the thickness of the sleeve, one surface being axially tapered.

3. In an expansion arbor, an expansible element including a length of continuous sleeve having a series of spaced longitudinal grooves the length of its outer surface and a series of spaced longitudinal grooves the length of its inner surface, one surface being axially tapered, said grooves having a depth of substantially one half the thickness of said sleeve.

4. A spindle and means for fastening a piece thereto comprising an expansible sleeve having a portion of its bore tapered and fitted on a tapered portion of said spindle, a series of longitudinal grooves in the inner surface of said sleeve, a series of external longitudinal grooves in the outer surface of said sleeve the grooves of both series extending to a depth less than the thickness of the sleeve, the outer diameter of the spindle being of a dimension determined by the bore of the work piece, and means mounted on the spindle for shifting said sleeve longitudinally thereof in opposite directions to expand and contract said sleeve.

5. A spindle and means for fastening a piece thereto comprising an expansible sleeve having a portion of its bore tapered and fitted on a tapered portion of said spindle, a series of longitudinal grooves in the inner surface of said sleeve, a series of external longitudinal grooves in the outer surface of said sleeve the grooves of both series extending to a depth less than the thickness of the sleeve, the outer diameter of the spindle being of a dimension determined by the bore of the work piece, and means mounted on the spindle for shifting said sleeve longitudinally thereof in opposite directions to expand and contract said sleeve, said means comprising a nut threaded on said spindle and connected to said sleeve for longitudinal movement therewith but rotatable independently thereof.

6. An expansion arbor consisting of a sleeve having a series of spaced longitudinal grooves in its outer surface and a series of spaced longitudinal grooves in its inner surface, the said sleeve having portions of its outer surface at equally spaced intervals at a greater radial distance from the center than throughout the intermediate portions.

7. An expansion arbor consisting of a sleeve having a series of spaced longitudinal grooves in its outer surface and a series of spaced longitudinal grooves in its inner surface, said sleeve having three portions of its outer surface at equally spaced intervals at a greater radial distance from the center than throughout the intermediate portions.

8. An expansion arbor consisting of a sleeve having a series of spaced longitudinal grooves in its outer surface and a series of spaced longitudinal grooves in its inner surface, said sleeve having a portion of its length intermediate its ends of reduced overall diameter.

9. The combination with a spindle of an expansion arbor for creating a driving connection between said spindle and a member to be driven comprising a sleeve having spaced slots in its outer surface and spaced slots in its inner surface, the two series of slots being circumferentially staggered with respect to each other, said spindle having a tapered portion engaging the bore of said sleeve throughout a portion of its length at one end, a tapered member mounted co-axially with said spindle and engaging the bore of the sleeve at the other end, and means for shifting said spindle and said tapered member axially toward and away from each other to expand and contract said arbor.

HANS WOLLNER.

REFERENCES CITED

The following references are of record in the file of this patent:

UNITED STATES PATENTS

| Number | Name | Date |
| --- | --- | --- |
| 291,282 | Blue | June 1, 1884 |
| 404,477 | Griffin | June 4, 1889 |
| 525,645 | Berner | Sept. 4, 1894 |
| 1,250,532 | Ulrich | Dec. 18, 1917 |
| 1,343,273 | Moore | June 15, 1920 |
| 2,226,078 | Spahn | Dec. 24, 1940 |
| 2,348,819 | Johnson | Mar. 16, 1944 |

FOREIGN PATENTS

| Number | Country | Date |
| --- | --- | --- |
| 113,110 | Germany | Aug. 30, 1900 |
| 138,050 | Germany | Jan. 16, 1903 |

OTHER REFERENCES

American Machinist, page 438, May 14, 1942.